United States Patent
Valensa et al.

(10) Patent No.: US 7,104,314 B2
(45) Date of Patent: Sep. 12, 2006

(54) MULTI-PASS HEAT EXCHANGER

(75) Inventors: Jeroen Valensa, New Berlin, WI (US); Michael J. Reinke, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 31 days.

(21) Appl. No.: 10/882,045

(22) Filed: Jun. 29, 2004

(65) Prior Publication Data

US 2005/0284619 A1    Dec. 29, 2005

(51) Int. Cl.
*F28F 1/10* (2006.01)
(52) U.S. Cl. ...................... 165/164; 165/172
(58) Field of Classification Search ............... 165/164, 165/165, 172, 177
See application file for complete search history.

(56) References Cited

U.S. PATENT DOCUMENTS

| | | | | |
|---|---|---|---|---|
| 2,894,731 A | * | 7/1959 | Wurtz | 165/130 |
| 3,273,227 A | * | 9/1966 | Pauls | 165/170 |
| 3,416,600 A | * | 12/1968 | Fink | 165/177 |
| 4,942,654 A | * | 7/1990 | Wright et al. | 29/890.035 |
| 5,036,909 A | * | 8/1991 | Whitehead et al. | 165/133 |
| 5,531,268 A | * | 7/1996 | Hoshino et al. | 165/153 |
| 5,875,837 A | * | 3/1999 | Hughes | 165/140 |
| 6,546,999 B1 | * | 4/2003 | Dienhart et al. | 165/150 |
| 6,892,803 B1 | * | 5/2005 | Memory et al. | 165/165 |

* cited by examiner

*Primary Examiner*—Teresa J. Walberg
(74) *Attorney, Agent, or Firm*—Wood, Phillips, Katz, Clark & Mortimer

(57) ABSTRACT

A heat exchanger is provided for transferring heat between a first fluid flow and a second fluid flow. The heat exchanger includes a first fluid flow path having a major dimension and a minor dimension and a second fluid flow including at least two flat tubes each having a major dimension and a minor dimension. Each of the flat tubes have at least two passes. Each tube has a transition region joining adjacent passes. Each transition region extends beyond the first fluid flow path major dimension.

34 Claims, 3 Drawing Sheets

MULTI-PASS HEAT EXCHANGER

FIELD OF THE INVENTION

This invention relates to multi-pass heat exchangers, and in more particular applications, to multi-pass heat exchangers having flat tubes for at least one fluid flow path.

BACKGROUND OF THE INVENTION

Flat tube heat exchangers are employed in a wide variety of situations for transferring heat between a first fluid flow and a second fluid flow. One specific example of where flat tube heat exchangers can be employed is in fuel cell systems for transferring heat between fluid flows to improve overall system efficiency. Specifically, heat exchangers may be utilized in fuel processing subsystems of fuel cell systems to transfer heat between a reformate flow and a coolant flow to cool the reformate flow prior to entry into a carbon monoxide removal unit.

In many PEM fuel cell systems, a fuel such as methane or a similar hydrocarbon fuel is converted into a hydrogen-rich stream for the anode side of the fuel cell. In many systems, humidified natural gas (methane) and air are chemically converted to a hydrogen-rich stream known as reformate by a fuel processing subsystem of the fuel cell system. This conversion takes place in a reformer where the hydrogen is catalytically released from the hydrocarbon fuel. A common type of reformer is an Auto-Thermal Reactor (ATR), which uses air and steam as oxidizing reactants. As the hydrogen is liberated, a substantial amount of carbon monoxide (CO) is created which must be reduced to a low level (typically less than 10 ppm) to prevent poisoning of the PEM membrane.

The catalytic reforming process consists of an oxygenolysis reaction with an associated water-gas shift [$CH_4 + H_2O \rightarrow CO + 3H_2$, $CO + H_2O \rightarrow CO_2 + H_2$] and/or a partial oxidation reaction [$CH_4 + \frac{1}{2} O_2 \rightarrow CO + 2H_2$]. While the water-gas shift reaction removes some of the CO from the reformate flow stream, the overall reformate stream will always contain some level of CO, the amount being dependent upon the temperature at which the reforming process occurs. After the initial reactions, the CO level of the reformate flow is well above the acceptable level for the PEM fuel cell. To reduce the CO concentration to within acceptable levels, several catalytic reactions will generally be used in the fuel processing subsystem to remove CO in the reformate flow. Typical reactions for reduction of CO in the reformate flow include the aforementioned water-gas shift, as well as a selective oxidation reaction over a precious metal catalyst (with a small amount of air added to the reformate stream to provide oxygen). Generally, several stages of CO cleanup are required to obtain a reformate stream with an acceptable CO level. Each of the stages of CO cleanup requires the reformate temperature be reduced to precise temperature ranges so that the desired catalytic reactions will occur and the loading amount of precious metal catalyst can be minimized.

In this regard, liquid-cooled heat exchangers are frequently employed to control the reformate temperature at each stage because of their compact size when compared to gas-cooled heat exchangers. Because liquid water entering the fuel processing subsystem must be heated so that it can be converted to steam for the reforming reactions, it is thermally efficient to use process water as the liquid coolant for the heat exchangers to cool the reformate flow prior to CO removal.

However, utilizing liquid-cooled heat exchangers to cool the reformate flow prior to entering CO removal units have a few conditions that should be considered. For example, the temperature of the reformate flow exiting the heat exchanger needs to be relatively precisely controlled so the CO removal processes can be optimized. Another factor to consider is the difference in flow rates between the reformate flow and the coolant flow.

SUMMARY OF THE INVENTION

In accordance with one form of the invention, a heat exchanger is provided for transferring heat between a first fluid flow and a second fluid flow. The heat exchanger includes a first fluid inlet, a first fluid outlet and a first fluid flow path extending between the first fluid inlet and the first fluid outlet. The first fluid flow path has a flattened transverse cross-section with a major dimension and a minor dimension. The heat exchanger also includes a second fluid inlet, a second fluid outlet and a second fluid flow path extending between the second fluid inlet and second fluid outlet. The second fluid flow path includes at least two flat tubes each having a major dimension and a minor dimension; each of the tubes having at least two passes; each pass being fluidly connected to an adjacent pass of the tube through a transition region of the tube. Each transition region extending beyond the first fluid flow path major dimension. The major dimension of each of the flat tubes being substantially equal to or less than the combination of the first fluid flow path minor dimension and the minor dimension of the flat tube.

According to one form, a heat exchanger is provided for transferring heat between a first fluid flow and a second fluid flow. The heat exchanger includes a plurality of heat exchange layers. Each heat exchange layer includes a first fluid inlet, a first fluid outlet, a first fluid flow path extending between the first fluid inlet and the first fluid outlet, a second fluid inlet, a second fluid outlet and a second fluid flow path extending between the second fluid inlet and second fluid outlet. The first fluid flow path having a flattened transverse cross-section with a major dimension and a minor dimension. The second fluid flow path includes at least two flat tubes each having a major dimension and a minor dimension; each of the tubes having at least two passes; each pass being fluidly connected to an adjacent pass of the tube through a transition region of the tube. Each transition region extending beyond the first fluid flow path major dimension. The major dimension of each of the tubes being substantially equal to or less than the combination of the first fluid flow path minor dimension and the minor dimension of the flat tube.

In one form, the transition regions of each heat exchange layer are adjacent, but not touching, the transition regions of any adjacent heat exchange layers.

According to one form, the transition region includes a first substantially 90° twist, a first substantially 90° bend, a second substantially 90° bend and a second 90° twist.

In one form, the passes are arranged in a generally cross-flow direction to the first fluid flow path.

According to one form, the second fluid flow path is arranged in a generally concurrent flow direction to the first fluid flow path.

In one form, the at least two flat tubes are arranged in a serpentine configuration.

According to one form, the at least two flat tubes are extruded.

In accordance with one form, the at least two flat tubes are aluminum.

According to one form, each of the flat tubes comprises at least two pairs of adjacent passes for each flat tube.

In one form, each said pair of passes are joined by a transition region, each adjacent pair being joined by a transition region between one of the passes of each of said adjacent pair, the transition region of each adjacent pair extending over the transition region of one of said pairs of passes of the other tube.

According to one form, the first fluid flow path comprises at least one flattened tube. In one form, the at least one tube is aluminum. Further in accordance with one form, the at least one tube of the first flow path is brazed to the tubes of the second fluid flow path.

Other objects, advantages, and features will become apparent from a complete review of the entire specification, including the appended claims and drawings.

DETAILED DESCRIPTION OF THE PREFERRED EMBODIMENTS

Figure 1:
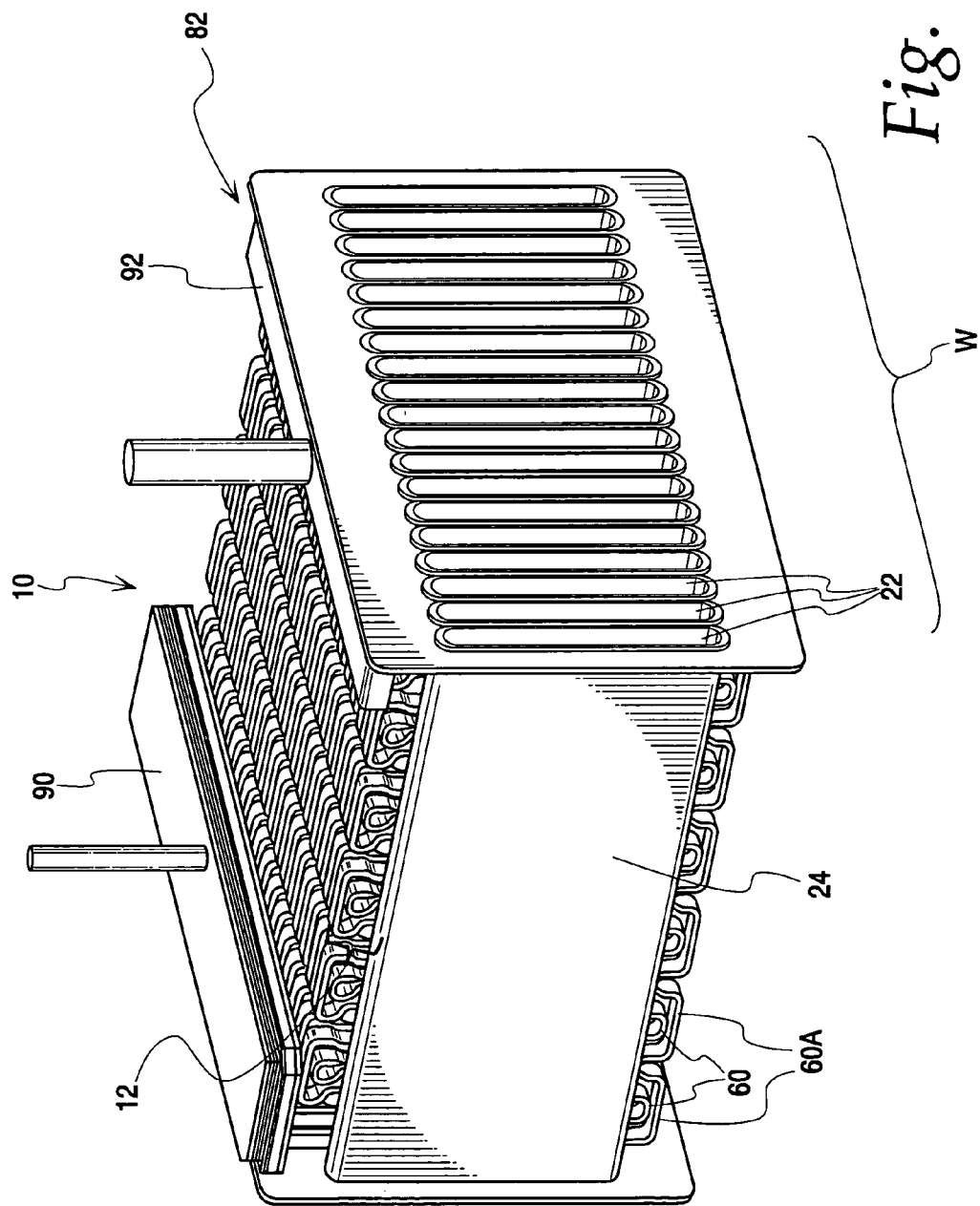
FIG. 1 is a perspective view of a heat exchange embodying the present invention.

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

A heat exchanger 10 embodying the present invention is shown in FIG. 1 for transferring heat between a first fluid flow (not shown) and a second fluid flow (not shown). As shown in FIG. 1, the heat exchanger comprises a plurality of heat exchange layers 12, with each layer 12 transferring heat between the first fluid flow and the second fluid flow. The layers 12 are arranged in a generally parallel manner, as seen in FIG. 1. While a plurality of heat exchange layers 12 are shown in FIG. 1, it should also be understood by one skilled in the art that the heat exchanger 10 may include any number of heat exchange layers 12 and may include as few as one layer 12.

Figure 2:
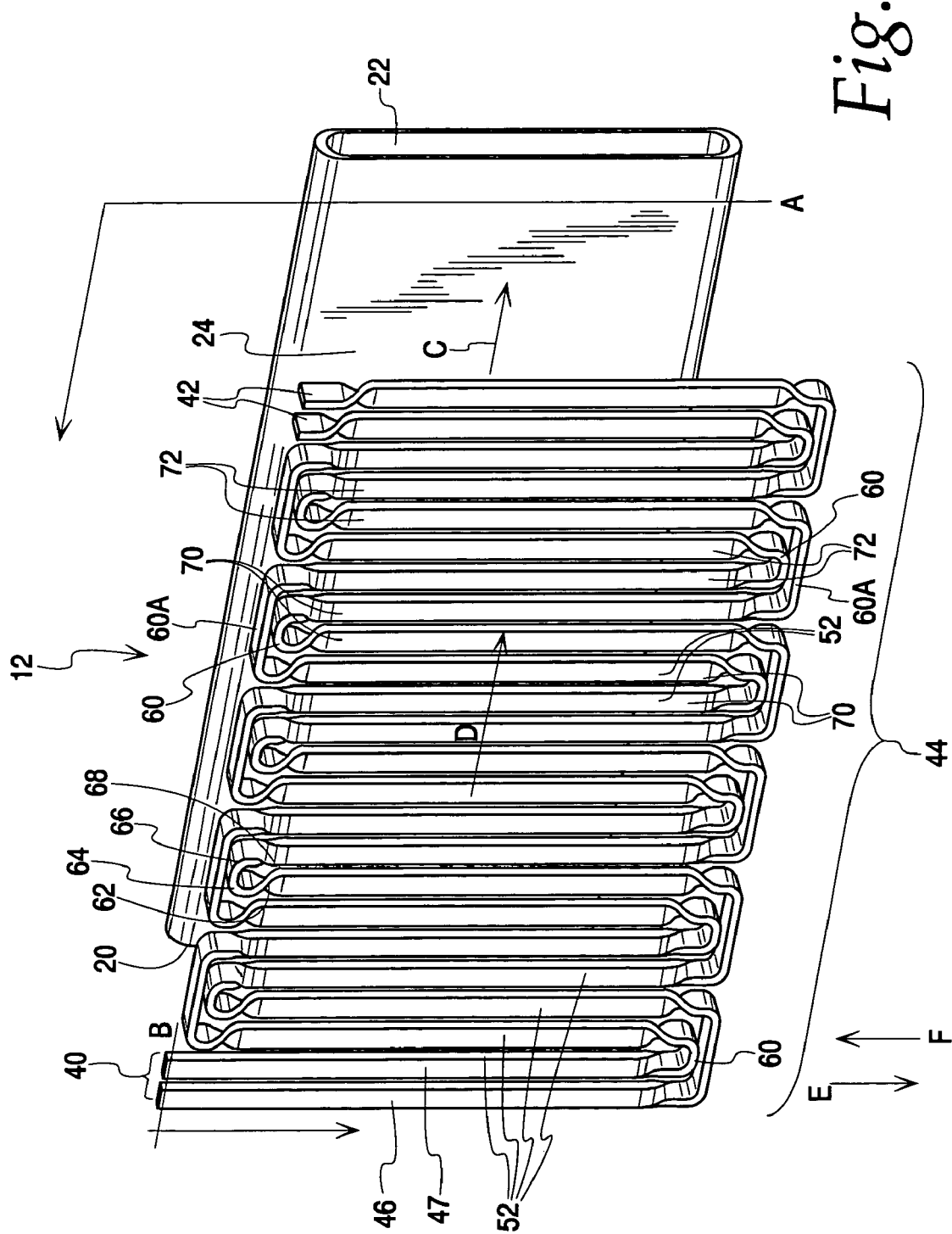
FIG. 2 is a cutaway view of a layer of the heat exchanger of FIG. 1.
Figure 3:
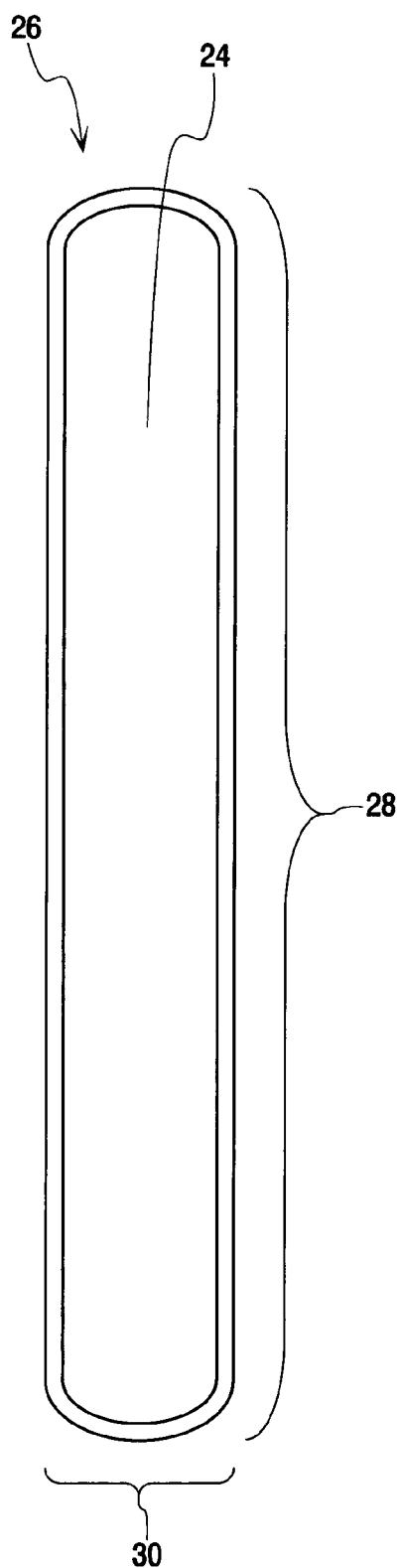
FIG. 3 is a cross-sectional view of a first fluid flow path taken along line A of FIG. 2.

Referring to FIG. 2, a single layer 12 is shown. Each heat exchange layer 12 includes a first fluid inlet 20, a first fluid outlet 22 and a first fluid flow path 24 extending between the first fluid inlet 20 and first fluid outlet 22 and shown in the form of a flattened tube 24. Referring to FIG. 3, taken along line A of FIG. 2, the first fluid flow path 24 has a flattened transverse cross-section 26 with a major dimension 28 and a minor dimension 30.

Figure 4:
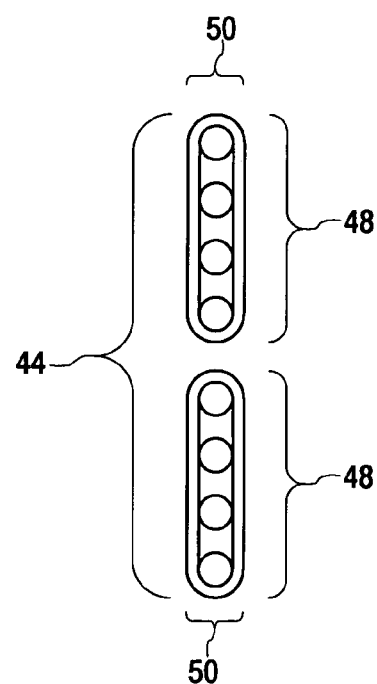
FIG. 4 is a cross-sectional view of a second fluid flow path taken along line B of FIG. 2.

Each heat exchange layer 12 also includes a second fluid inlet 40, a second fluid outlet 42 and a second fluid flow path 44 extending between the second fluid inlet 40 and second fluid outlet 42. The second fluid flow path 44 includes at least two flattened multi-port tubes 46,47, although the second fluid flow path 44 may optionally include more than two tubes. As seen in FIG. 4, taken along line B of FIG. 2, each flat tube 46,47 has a major dimension 48 and a minor dimension 50. Preferably, for reasons explained below, the major dimension 48 of each of the tubes 46,47 is substantially equal to or less than the combination of the first fluid flow path 24 minor dimension 30 and the minor dimension 50 of the flat tube 46,47.

Referring back to FIG. 2, each of the flat tubes 46,47 has at least two passes 52 preferably extending parallel within reasonable manufacturing tolerances to the major dimension 28 of the first fluid flow path 24 and transverse to the mean direction of fluid flow through the first fluid flow path 24 illustrated by arrow C. Each pass 52 being fluidly connected to an adjacent pass 52 through a transition region 60. Each transition region 60 extending beyond the first flow path 24 major dimension 28. Thus, each of the passes 52 is arranged in a generally cross-flow direction as indicated by arrows E and F to the direction of first fluid flow path 24 indicated by arrow C. The tubes 46,47 are preferably arranged in a generally serpentine manner.

The transition region 60 preferably includes a first substantially 90° twist 62, a first substantially 90° bend 64, a second substantially 90° bend 66 and a second 90° twist 68. There are other suitable formations for the transition region 60. For example, one 180° bend could be substituted for the first and second 90° bends 64,66.

As seen in FIG. 2, each tube 46,47 includes at least two pairs 70,72 of adjacent passes 52. As described above, for tube 46 each pass 52 of each pair 70 is fluidly connected to an adjacent pass 52 of the pair 70 through one of the transition regions 60. Additionally, each adjacent pair 70,72 is joined by a transition region 60A between one of the passes 52 of each said pair 70,72. Each of the transition regions extend over the transition region 60 of one of said pairs 70,72 of passes 52 of the other tube 46,47. Therefore, the transition regions 60A of tube 46 extend over the transition regions 60 of tube 47 and vice versa.

The transition regions 60 and 60A are located so that they clear the major dimension 28 of the first fluid flow path 24. The transition regions 60 clear the major dimension 28 because for each layer 12, the tubes 46,47 are contacting the first fluid flow path 24 of layer 12 and preferably the first fluid flow path 24 of any adjacent layer 12, thereby, in most cases in FIG. 2, contacting two first fluid flow paths 24. If the transition regions 60 were located within the major dimension 28, the tubes 46,47 would not contact two first fluid flow paths 24 because the major dimension 48 is larger than the minor dimension 50. To state this in other words, the tubes 46,47 can be sandwiched between adjacent pairs of the first fluid flow path 24 because the transition regions 60 extend beyond the major dimension 28 so as not to interfere with the first flow path 24.

Furthermore, in this same vein, the major dimension 48 is substantially equal to or less than the combination of the first fluid flow path 24 minor dimension 30 and the minor dimension 50 of the flat tube 46 because each transition region 60 of each layer 12 should not interfere with the transition region 60 of adjacent layers 12 as seen in FIG. 1. In one form, each of the transition regions 60 extend approximately halfway over the minor dimension 30 of any adjacent first fluid flow path 24.

The first fluid flows from the first fluid inlet 20 to the first fluid outlet 22 via the first fluid flow path 24. Simultaneously, the second fluid flows from the second fluid inlet 40 to the second fluid outlet 42 via the second fluid flow path 44. As the first and second fluids flow through the respective flow paths 24 and 44, heat is transferred between the fluids. Even though the individual passes 52 are transverse to the mean flow direction C of the first fluid flow path 24, the mean flow direction of the second fluid through the second fluid flow path 44 (shown by arrow D in FIG. 2) has a generally concurrent flow relation to the flow direction C of the first fluid flow path 24, thereby having the first and second fluids exiting the heat exchanger at a common end 82 of the heat exchanger. This concurrent flow relationship allows the temperatures of the first and second fluids to approach a common exit temperature at the end 82.

In a preferred form, as seen in FIG. 2, the first fluid flow path 24 is a flattened tube. It should be understood by one skilled in the art that the first fluid flow path may take many forms such as on oval-shaped tube, square tube, rectangular tube or the like. In another form, the first fluid flow path 24 may take the form of a bar-plate construction, a drawn cup plate construction, or other suitable flow path construction. If utilizing plates, each layer 12 may include at least two flat plates to define the first fluid flow path 24.

Additionally, the first fluid flow path 24 may be manufactured from any conventional material suitable for use in heat exchangers. Such suitable materials include stainless steel, aluminum, plastics, alloys or the like. In one form, the first fluid flow path 24 is manufactured from aluminum, and in a preferred form the first fluid flow path 24 is at least one extruded aluminum tube. Additionally, the first fluid flow path may include any suitable internal surface augmentation or fin, many forms of which are known.

Additionally, the second fluid flow path 44 may similarly be constructed from any conventional material suitable for use in heat exchangers. Such suitable materails include stainless steel, aluminum, plastics, alloys, or the like. In one form, the second fluid flow path 44 is manufactured from aluminum, and in a preferred form the second fluid flow path 44 is extruded aluminum tubes.

Preferably, the first fluid flow paths 24 are bonded to adjacent second fluid flow path 44 in any suitable manner for constructing heat exchangers, many of which are known. Specifically, the first fluid flow paths 24 may be brazed, soldered, welded, or the like to the second fluid flow paths 44. In a preferred form, the first fluid flow paths 24 are extruded aluminum tubes, the second fluid flow paths 44 are extruded aluminum tubes, and the first fluid flow path 24 is brazed to the second fluid flow path 44.

The heat exchanger 10 may also include additional components as required for specific situations. The additional components may include conventional components utilized with conventional heat exchangers. Such additional components may include a first fluid inlet manifold (not shown) to distribute the first fluid to each of the paths 24, a first fluid outlet manifold (not shown) to collect the first fluid from the paths 24, a second fluid inlet manifold 90 to distribute the second fluid to each of the paths 44, a second fluid outlet manifold 92 to collect the second fluid from the paths 44, temperature sensors (not shown), flow controllers (not shown), or other conventional components. The details of such components will be highly dependent upon the particular parameters of each application, such as, for example, the types of fluids, the phases of the fluids in the heat exchanger, the flow rates of the fluids, etc.

By utilizing two smaller flat tubes 46,47 (or more than two tubes, if required) as opposed to a single larger flat tube, the flow area of the second fluid flow path 44 can be increased without increasing the width along the direction indicated by arrow W. Specifically, if one larger tube were utilized having a flow area equivalent to the combined flow area provided by the tubes 46 and 47, the overall height of the heat exchanger would have to increase because more room would be required between the layers 12 to prevent interference between the transition regions 60 of adjacent layers 12.

The heat exchanger 10 may be suitable in applications with disproportionate relative mass flows between the first and second fluids. Specifically, the first fluid may have a large mass flow rate while the second fluid has a much smaller mass flow rate.

Furthermore, the heat exchanger 10 may be suitable in applications with disproportionate residence times for the first and second fluid flows respectively. The residence time is the amount of time that the respective flow is between the respective inlet and outlet. The residence time of the second fluid flow may be increased without changing the mass flow rate by increasing the number of passes 52. Similarly, the residence time of the second fluid flow may be decreased without changing the mass flow rate by decreasing the number of passes 52.

Similarly, the heat exchanger 10 may be suitable in applications where a fluid transitions from a liquid to a superheated vapor. Specifically, the second fluid flow may be water flowing at a relatively low mass flow rate compared to the first fluid flow.

For example, in one embodiment the heat exchanger 10 may be suitable for use in a fuel processing subsystem for a fuel cell system. Specifically, as previously described, a fuel processing subsystem converts a fuel flow into a reformate flow containing hydrogen and carbon monoxide (CO) amongst other species. After the initial reforming reaction, poisonous CO must be removed from the reformate flow prior to entering the fuel cell. Generally, to remove CO from a reformate flow the temperature of the reformate flow must be within specific temperature range to optimize the CO removal process. The heat exchanger 10 is a suitable heat exchanger for reducing the temperature of the reformate flow to within the desired temperature range while also vaporizing a process water flow that acts as a coolant in the heat exchanger 10.

Specifically, prior to entering the CO removal unit, the reformate flow will enter the heat exchanger 10 via the first fluid inlet 20, travel through the firsts fluid flow path 24 and exit the heat exchanger via the first fluid outlet 22. Concurrently, a process water flow will enter the heat exchanger 10 via the second fluid inlet 40, travel through the second fluid flow path 44 (flat tubes 46,47) and exit the heat exchanger 10 via the second fluid outlet 42. While flowing through the first fluid flow path, the reformate flow will transfer heat to the water flow in the tubes 46,47. The temperature of the water will increase until it reaches phase change conditions and will begin to vaporize from a liquid to a gas (steam). Preferably, the flow rate of the water flow is controlled so that all of the water flow is transformed from a liquid flow into a superheated steam flow. The heat exchanger 10 preferably has sufficient effectiveness to fully vaporize the water flow and bring the water flow and reformate flow towards a common outlet temperature under normal operating conditions. Additionally, the heat exchanger 10 is arranged such that the reformate flow and the water flow flow in a generally concurrent manner similar to the flow described for FIG. 2. Because a large amount of heat must be transferred from the reformate flow (which has a flow rate fixed by the requirements of the fuel cell) to vaporize the process water flow, the mass flow rate of the process water flow will typically be much smaller relative to the mass flow rate of the reformate flow. The heat exchanger 10 is ideally suited to these differing flow rates.

It should be understood that while the heat exchanger 10 is described herein as particularly advantageous for use in fuel processing systems, the heat exchanger 10 may find use in any number of systems desiring heat transfer between a first and a second fluid flow. Accordingly, no limitation to use with fuel processing systems is intended unless specifically recited in the claims.

The invention claimed is:

1. A heat exchanger for transferring heat between a first fluid flow and a second fluid flow, the heat exchanger comprising:
   a first fluid inlet, a first fluid outlet and a first fluid flow path extending between the first fluid inlet and the first fluid outlet, the first fluid flow path having a flattened transverse cross-section with a major dimension and a minor dimension; and
   a second fluid inlet, a second fluid outlet and a second fluid flow path extending between the second fluid inlet and second fluid outlet,
      the second fluid flow path including at least two flat tubes each having a major dimension and a minor dimension, each of the tubes having at least two passes, each pass being fluidly connected to an adjacent pass of the tube through a transition region of the tube, each transition region extending beyond the first fluid flow path major dimension, the major dimension of each of the flat tubes being substantially equal to or less than the combination of the first fluid flow path minor dimension and the minor dimension of the flat tube.

2. The heat exchanger of claim 1 wherein the passes are arranged in a generally cross-flow direction to the first fluid flow path.

3. The heat exchanger of claim 1 wherein the second fluid flow path is arranged in a generally concurrent flow direction to the first fluid flow path.

4. The heat exchanger of claim 1 wherein the at least two flat tubes are arranged in a serpentine configuration.

5. The heat exchanger of claim 1 wherein the at least two flat tubes are extruded.

6. The heat exchanger of claim 1 wherein the at least two flat tubes are aluminum.

7. The heat exchanger of claim 1 wherein the first fluid flow path comprises at least one flattened tube.

8. The heat exchanger of claim 7 wherein the at least one tube is aluminum.

9. The heat exchanger of claim 7 wherein the at least one tube of the first flow path is brazed to the tubes of the second fluid flow path.

10. The heat exchanger of claim 1 wherein each of the flat tubes comprises at least two pairs of adjacent passes for each flat tube.

11. The heat exchanger of claim 10 wherein each said pair of passes are joined by a transition region, each adjacent pair being joined by a transition region between one of the passes of each of said adjacent pair, the transition region of each adjacent pair extending over the transition region of one of said pairs of passes of the other tube.

12. A heat exchanger for transferring heat between a first fluid flow and a second fluid flow, the heat exchanger comprising:
   a plurality of heat exchange layers,
      each heat exchange layer including a first fluid inlet, a first fluid outlet, a first fluid flow path extending between the first fluid inlet and the first fluid outlet, a second fluid inlet, a second fluid outlet and a second fluid flow path extending between the second fluid inlet and second fluid outlet, the first fluid flow path having a flattened transverse cross-section with a major dimension and a minor dimension,
      the second fluid flow path including at least two flat tubes each having a major dimension and a minor dimension, each of the tubes having at least two passes, each pass being fluidly connected to an adjacent pass of the tube through a transition region of the tube, each transition region extending beyond the first fluid flow path major dimension, the major dimension of each of the tubes being substantially equal to or less than the combination of the first fluid flow path minor dimension and the minor dimension of the flat tube.

13. The heat exchanger of claim 12 wherein the passes are arranged in a generally cross-flow direction to the first fluid flow path.

14. The heat exchanger of claim 12 wherein the second fluid flow path is arranged in a generally concurrent flow direction to the first fluid flow path.

15. The heat exchanger of claim 12 wherein the at least two flat tubes are arranged in a serpentine configuration.

16. The heat exchanger of claim 12 wherein the at least two flat tubes are extruded.

17. The heat exchanger of claim 12 wherein the at least two flat tubes are aluminum.

18. The heat exchanger of claim 12 wherein the first fluid flow path comprises at least one flattened tube.

19. The heat exchanger of claim 18 wherein the at least one tube is aluminum.

20. The heat exchanger of claim 18 wherein the at least one tube of the first flow path is brazed to the tubes of the second fluid flow path.

21. The heat exchanger of claim 12 wherein each of the flat tubes comprises at least two pairs of adjacent passes for each flat tube.

22. The heat exchanger of claim 21 wherein each said pair of passes are joined by a transition region, each adjacent pair being joined by a transition region between one of the passes of each of said adjacent pair, the transition region of each adjacent pair extending over the transition region of one of said pairs of passes of the other tube.

23. The heat exchanger of claim 12 wherein the transition regions of each heat exchange layer are adjacent, but not touching, the transition regions of any adjacent heat exchange layers.

24. A heat exchanger for transferring heat between a first fluid flow and a second fluid flow, the heat exchanger comprising:
   a first fluid inlet, a first fluid outlet and a first fluid flow path extending between the first fluid inlet and the first fluid outlet, the first fluid flow path having a flattened transverse cross-section with a major dimension and a minor dimension; and
   a second fluid inlet, a second fluid outlet and a second fluid flow path extending between the second fluid inlet and second fluid outlet,
      the second fluid flow path including at least two flat tubes each having a major dimension and a minor dimension, each of the tubes having at least two passes, each pass being fluidly connected to an adjacent pass of the tube through a transition region of the tube, each transition region extending beyond the first fluid flow path major dimension, the major dimension of each of the flat tubes substantially equal to or less than the combination of the first fluid flow path minor dimension and the second fluid flow path minor dimension, each transition region including a first substantially 90° twist, a first substantially 90° bend, a second substantially 90° bend and a second 90° twist.

25. The heat exchanger of claim 24 wherein the passes are arranged in a generally cross-flow direction to the first fluid flow path.

26. The heat exchanger of claim 24 wherein the second fluid flow path is arranged in a generally concurrent flow direction to the first fluid flow path.

27. The heat exchanger of claim 24 wherein the at least two flat tubes are arranged in a serpentine configuration.

28. The heat exchanger of claim 24 wherein the at least two flat tubes are extruded.

29. The heat exchanger of claim 24 wherein the at least two flat tubes are aluminum.

30. The heat exchanger of claim 24 wherein the first fluid flow path comprises at least one flattened tube.

31. The heat exchanger of claim 30 wherein the at least one tube is aluminum.

32. The heat exchanger of claim 30 wherein the at least one tube of the first flow path is brazed to the tubes of the second fluid flow path.

33. The heat exchanger of claim 24 wherein each of the flat tubes comprises at least two pairs of adjacent passes for each flat tube.

34. The heat exchanger of claim 33 wherein each said pair of passes are joined by a transition region, each adjacent pair being joined by a transition region between one of the passes of each of said adjacent pair, the transition region of each adjacent pair extending over the transition region of one of said pairs of passes of the other tube.

* * * * *